R. W. LINDHÉ.
BALL RETAINER FOR BALL BEARINGS.
APPLICATION FILED MAR. 17, 1917.

1,254,332.

Patented Jan. 22, 1918.

WITNESSES:

INVENTOR:
Roland Wallace Lindhé
By Attorneys,

R. W. LINDHE.
BALL RETAINER FOR BALL BEARINGS.
APPLICATION FILED MAR. 17, 1917.

1,254,332.

Patented Jan. 22, 1918.
2 SHEETS—SHEET 2.

WITNESSES:

INVENTOR:
Roland Wallace Lindhé
By Attorneys,

UNITED STATES PATENT OFFICE.

ROLAND WALLACE LINDHÉ, OF MOSCOW, RUSSIA, ASSIGNOR TO AKTIEBOLAGET SVENSKA KULLAGERFABRIKEN, OF GOTTENBERG, SWEDEN, A CORPORATION OF SWEDEN.

BALL-RETAINER FOR BALL-BEARINGS.

1,254,332.   Specification of Letters Patent.   Patented Jan. 22, 1918.

Application filed March 17, 1917. Serial No. 155,602.

*To all whom it may concern:*

Be it known that I, ROLAND WALLACE LINDHÉ, a subject of the King of Sweden, residing at Moscow, in the Empire of Russia, have invented certain new and useful Improvements in Ball-Retainers for Ball-Bearings, of which the following is a specification, reference being had to the drawings accompanying and forming a part thereof.

This invention relates to ball retainers for ball bearings and particularly to ball retainers consisting of two separate rings having holes for the balls and held together by the balls themselves.

In order to facilitate the insertion of the balls in ball retainers of this type, it has been proposed to make the holes of one of the rings of a diameter corresponding to the diameter of the balls. In such case, however, certain measures must be taken to retain the balls inserted. This has been done in several ways, for instance by reducing the holes in size by beating down the material surrounding them. By such means, however, a further working operation is required, resulting in a more expensive ball retainer, and, moreover, the risk exists that the balls will be jammed so that they cannot turn freely.

The object of the invention is to remove the said drawbacks.

The invention consists, chiefly, in that the holes in both rings are of smaller diameter than the diameter of the balls. The balls inserted between the rings are retained by the seats formed by opposite holes, no other means for securing the balls being required and any risk of jamming the balls being excluded.

The invention further consists in the construction and combination of parts hereinafter described and particularly pointed out in the claims.

In the drawings, Figure 1 is a side elevation, partly in section, of a ball retainer according to the invention. Fig. 2 is a plan view thereof. Figs. 3 to 5 show modifications of the ball retainer. Fig. 6 shows a bearing having a ball retainer according to the invention, and Figs. 7 and 8 show another form.

Referring first to Figs. 1 and 2, the ball retainer consists of two concentric cylindrical rings 1 and 2 having holes 3 and 4, respectively, for the balls 5. According to the invention, the diameter of the holes in both rings is smaller than the diameter of the balls, the balls being inserted by making use of the elasticity of the rings.

The ball retainer shown in Fig. 3, which is adapted for a double row ball bearing of the well-known cup and cone type, differs from the retainer shown in Figs. 1 and 2 substantially in the rings 1 and 2 being conical in shape.

In the ball retainer shown in Fig. 4, the rings are curved in cross-section, the convex sides of the rings facing each other, said form facilitating the insertion of the balls.

Figure 1:
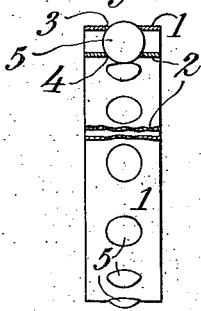
Figure 2:
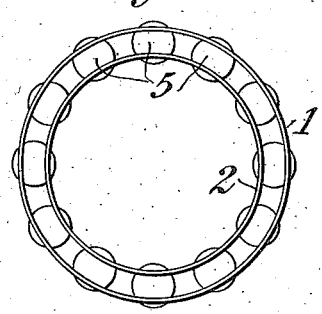
Figure 3:
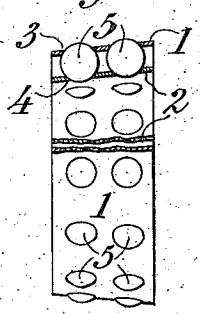
Figure 4:
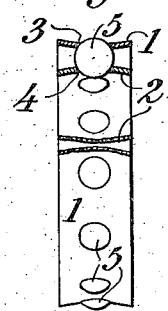
Figure 5:
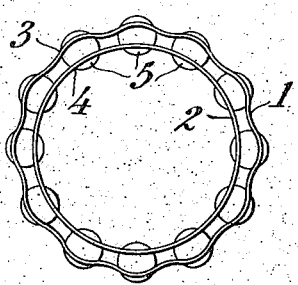
Fig. 5 shows a ball retainer according to the invention in which the outer ring is folded in peripheral direction so as to form pockets for the balls. Obviously, the inner ring may be folded instead of the outer one, or both rings may be folded.
Figure 6:
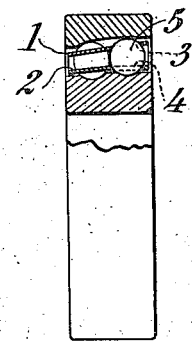
Fig. 6 shows a double row ball bearing for radial and axial load, said bearing being provided with a ball retainer the outer ring of which is conical in shape, while the inner ring is partly conical and partly cylindrical. Also in this case the outer ring of the ball retainer may be folded, as shown in Fig. 5.

The mounting of the bearing shown in Fig. 6 is performed in the following way: First the balls are inserted in the ball retainer in the manner hereinbefore described, and then the inner ring of the bearing is pressed, in a direction from the right toward the left in Fig. 6, into the ball retainer, the outer ring of the bearing being removed. The shoulders at the sides of the ball races of the inner ring of the bearing hereby move the balls outward, such movement being possible on account of the outer ring being removed. If the outer ring is folded, the elasticity of said ring facilitates the insertion of the inner ring of the bearing. When the said ring has been inserted, the balls are sprung into the ball races, and the inner ring of the bearing with the ball retainer and balls inserted therein can be introduced into the outer ring of the bearing. Thus, the bearing consists of three separate parts, viz., the inner ring, the ball retainer with the balls, and the outer ring.

Figure 7:
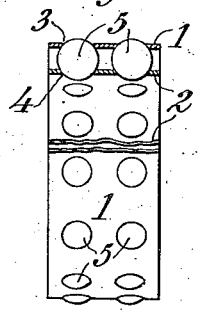
Figure 8:
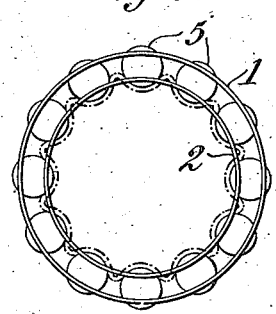

The ball retainer shown in Figs. 7 and 8 illustrates another way of inserting the balls. The inner ring 2 first has the corrugated form shown by dashed and dotted lines in Fig. 8. When the balls have been inserted, which can be done without making use, in any higher degree, of the elasticity of the rings, the ring 2 is pressed or shaped by any suitable tool into the circular form shown by full lines.

The invention is not limited to the constructional forms shown and described, as it is obvious that many changes may be made without departing from the spirit and scope of the invention. Thus the rings may be otherwise shaped in cross-section, and they may be made for ball bearings having three or more rows of balls.

I claim as my invention:—

1. A ball retainer for ball bearings consisting of two separate rings having holes of regular geometrical outline for the balls and held together by the balls themselves, said ball retainer being characterized by this that the holes in both rings are of smaller diameter than the diameter of the balls.

2. A ball retainer according to claim 1, characterized by the rings being wholly or partly of conical or conoidal shape.

3. A ball retainer according to claim 1, characterized by this that the rings are curved in cross-section, the convex sides of the rings facing each other.

In testimony whereof I affix my signature.

ROLAND WALLACE LINDHÉ.